(12) United States Patent
Sivaswamy et al.

(10) Patent No.: US 12,316,502 B2
(45) Date of Patent: May 27, 2025

(54) CREATING SETS OF HETEROGENEOUS INTERNET-OF-THINGS (IOT) DEVICES FROM WHICH TO UPLOAD DATA AS A PRE-STEP TO EDGE COMPUTING

(71) Applicant: INTERNATIONAL BUSINESS MACHINES CORPORATION, Armonk, NY (US)

(72) Inventors: Hemant Kumar Sivaswamy, Pune (IN); Venkata Vara Prasad Karri, Visakhapatnam (IN); Sarbajit K. Rakshit, Kolkata (IN); Afroz Khan, I, Davanagere (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/060,197

(22) Filed: Nov. 30, 2022

(65) Prior Publication Data
US 2024/0179062 A1    May 30, 2024

(51) Int. Cl.
*H04L 41/0893*    (2022.01)
*G16Y 40/30*    (2020.01)
*H04L 41/0823*    (2022.01)

(52) U.S. Cl.
CPC .......... *H04L 41/0893* (2013.01); *G16Y 40/30* (2020.01); *H04L 41/0823* (2013.01)

(58) Field of Classification Search
CPC .. H04L 41/0823; H04L 41/0893; G16Y 40/30
See application file for complete search history.

(56) References Cited

U.S. PATENT DOCUMENTS

| | | | |
|---|---|---|---|
| 9,712,645 B2 | 7/2017 | De Castro Alves | |
| 10,129,045 B2* | 11/2018 | Cho | .................... H04L 41/0873 |
| 10,559,202 B2 | 2/2020 | Yang | |
| 2014/0244715 A1* | 8/2014 | Hodges | ............... H04L 43/0817 |
| | | | 709/203 |
| 2015/0200847 A1* | 7/2015 | Gourlay | .............. H04L 41/0895 |
| | | | 370/392 |
| 2016/0217387 A1* | 7/2016 | Okanohara | ............ G06N 20/00 |
| 2018/0212833 A1 | 7/2018 | Bharti | |
| 2019/0098091 A1 | 3/2019 | Shinde | |
| 2019/0132236 A1* | 5/2019 | Rahman | ................. H04W 52/28 |
| 2019/0220703 A1 | 7/2019 | Prakash | |
| 2021/0133607 A1* | 5/2021 | Stubbs | .................... G06N 20/00 |
| 2021/0208570 A1* | 7/2021 | Furuichi | ................ G08G 1/163 |

(Continued)

*Primary Examiner* — Jason D Recek
(74) *Attorney, Agent, or Firm* — Anthony M. Pallone (57) ABSTRACT

According to one embodiment, a method, computer system, and computer program product for transmitting data from a set of edge devices is provided. The embodiment may include identifying one or more Internet-of-Things (IoT) devices within a structure. The embodiment may include combining the identified one or more IoT devices into one or more groups. The embodiment may include identifying a respective primary device for each group of the one or more groups. The embodiment may include deploying a tiny machine learning (ML) model on each identified respective primary device. In response to detection of an event within the structure by a group of the one or more groups, the embodiment may include utilizing the tiny ML model of a primary device of the group to select one or more other groups for activation.

17 Claims, 2 Drawing Sheets

(56) References Cited

U.S. PATENT DOCUMENTS

| | | |
|---|---|---|
| 2021/0307189 A1 | 9/2021 | Lucero |
| 2022/0147874 A1* | 5/2022 | Thakore .................... G06F 8/65 |
| 2023/0379664 A1* | 11/2023 | Yi .......................... H04W 4/06 |
| 2024/0022583 A1* | 1/2024 | Miserendino ....... H04L 63/1425 |

* cited by examiner

CREATING SETS OF HETEROGENEOUS INTERNET-OF-THINGS (IOT) DEVICES FROM WHICH TO UPLOAD DATA AS A PRE-STEP TO EDGE COMPUTING

BACKGROUND

The present invention relates generally to the field of computing, and more particularly to edge computing.

Edge computing is a method of optimizing cloud computing systems by performing data processing at the edge of the network, near the originating source of the data. This reduces network latency by minimizing communication time between end user computing devices and a central cloud data center (i.e., one or more cloud servers) and also reduces the communications bandwidth needed between them by performing analytics and knowledge generation at or near the source of data. In many cases such data processing is performed on the originating device itself. Through the use of edge computing, time sensitive data may be sent to an intermediary device, located in close geographical proximity to the originating source of data, whereas data that is less time sensitive may be sent to the cloud. Technologies driving implementation of edge computing include software-defined networking, fifth generation (5G) wireless networking, and the Internet-of-Things (IoT).

SUMMARY

According to one embodiment, a method, computer system, and computer program product for transmitting data from a set of edge devices is provided. The embodiment may include identifying one or more Internet-of-Things (IoT) devices within a structure. The embodiment may include combining the identified one or more IoT devices into one or more groups. The embodiment may include identifying a respective primary device for each group of the one or more groups. The embodiment may include deploying a tiny machine learning (ML) model on each identified respective primary device. In response to detection of an event within the structure by a group of the one or more groups, the embodiment may include utilizing the tiny ML model of a primary device of the group to select one or more other groups for activation.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to edge computing. The following described exemplary embodiments provide a system, method, and program product to, among other things, create metrics of heterogeneous Internet-of-Things (IoT) devices to upload from a select set of IoT devices as a pre-step to edge computing. Therefore, the present embodiment has the capacity to improve the technical field of edge computing by dynamically grouping and structuring IoT devices to pre-process gathered information of a detected event before transmitting, via a network, data of the event to a cloud resource, thus reducing the consumption of network bandwidth and reducing the burden (i.e., processing load) on the cloud resource.

As previously described, edge computing is a method of optimizing cloud computing systems by performing data processing at the edge of the network, near the originating source of the data. This reduces network latency by minimizing communication time between end user computing devices and a central cloud data center (i.e., one or more cloud servers) and also reduces the communications bandwidth needed between them by performing analytics and knowledge generation at or near the source of data. In many cases such data processing is performed on the originating device itself. Through the use of edge computing, time sensitive data may be sent to an intermediary device, located in close geographical proximity to the originating source of data, whereas data that is less time sensitive may be sent to the cloud. Technologies driving implementation of edge computing include software-defined networking, fifth generation (5G) wireless networking, and the Internet-of-Things (IoT).

The move towards edge computing has been driven, in part, by factors such as advances in mobile computing, decreasing cost of computer components, and the increasing utilization of networked IoT devices. Moreover, advances in the processing power of such IoT devices has further enabled widespread adoption of edge computing. However, as the number of IoT devices on a given network increases, transmission of tremendous amounts of collected data through the network infrastructure to a cloud data center for processing may become too intensive and unrealistic. This may be especially applicable in situations where near real-time processing of data is required (e.g., the monitoring of a premises using heterogeneous IoT devices). For example, a cloud service providing for the monitoring and maintenance of a structure through use of varying IoT devices (e.g., cameras, smoke detectors, moisture sensors, and hazardous gas detectors) within the structure may have difficulty (e.g., delay) in processing IoT-device-gathered-information resulting from detection of a disadvantageous event (e.g., a fire) within the structure as the bandwidth consuming data feed originating from all downstream IoT devices may increase exponentially thus negatively impacting operational efficiency (e.g., latency) of the cloud service. It may therefore be imperative to have a system in place to dynamically create groupings of varying IoT devices which are downstream from a cloud resource and enable transmission of data feeds from one or more selected groupings to the cloud resource. Thus, embodiments of the present invention may be advantageous to, among other things, group sets of heterogeneous IoT devices to form logically singular edged devices, identify an IoT device of a grouped set as a primary device of the grouped set, deploy a pre-trained tiny machine learning (ML) model on primary devices of grouped sets (i.e., edged devices), utilize compute power of one or more edged devices (i.e., grouped sets), activate transmission of data from selected grouped sets across a network to a cloud resource, avoid a network bottleneck, and reduce latency of a cloud resource. The present invention does not require that all advantages need to be incorporated into every embodiment of the invention.

According to at least one embodiment, heterogeneous IoT devices within a structure may be identified along with their respective locations. Identified IoT devices may be combined into one or more groupings where each grouping represents a respective edged device. A primary device of each grouping may be identified, and a pre-trained tiny ML model may be deployed on identified primary devices of respective groupings (i.e., respective edged devices). In response to an event within the structure being detected by one or more IoT devices of a grouping, the tiny ML model of the primary device of the grouping may take as input a status of the edged device represented by the grouping and transmit data of the event to a cloud resource, as well as direct an action of one or more other edged devices (i.e., one or more other groupings of IoT devices). A directed action may include selecting one or more edged devices for transmission of their respective data to the cloud resource, as well as selecting one or more other edged devices for restriction of transmission of their respective data to the cloud resource.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to combine varying IoT devices into one or more groups and, accordingly, transmit data of a detected event from one or more selected groups of IoT devices to a cloud resource while restricting transmission of data from one or more other groups of IoT devices to the cloud resource.

Figure 1:
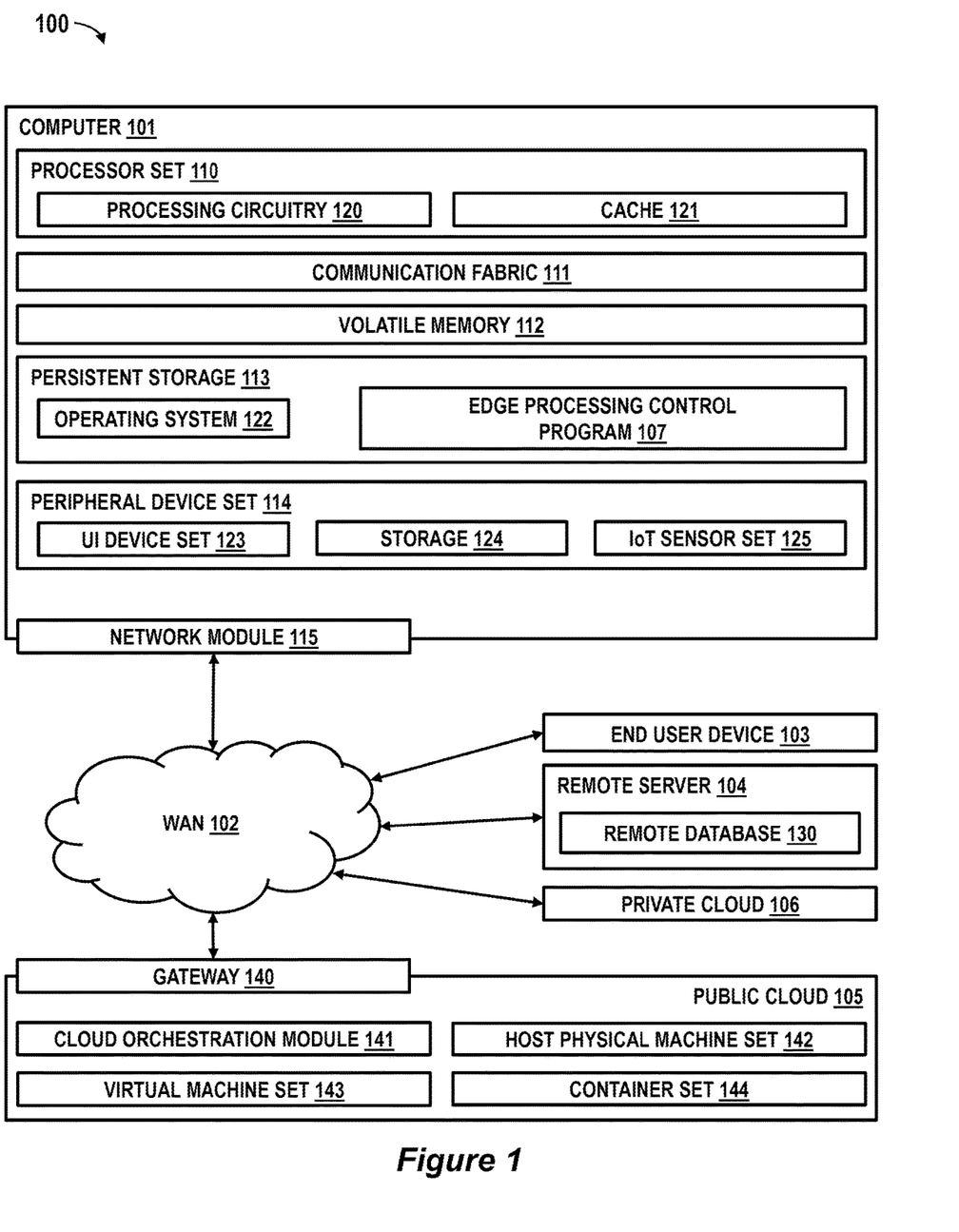
FIG. 1 illustrates an exemplary computer environment according to at least one embodiment.

Referring to FIG. 1, an exemplary computing environment 100 is depicted, according to at least one embodiment. Computing environment 100 contains an example of an environment for the execution of at least some of the computer code involved in performing the inventive methods, such as edge processing control (EPC) program 107. In addition to EPC program 107, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and EPC program 107), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smartphone, smart watch or other wearable computer, mainframe computer, quantum computer or any other form of computer or mobile device now known or to be developed in the future that is capable of running a program and accessing a network or querying a database, such as remote database 130. Additionally, computer 101 may be any other form of computer or mobile device now known or to be developed in the future that is AR/VR-enabled. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in EPC program 107 within persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in EPC program 107 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as smart glasses, smart watches, AR/VR-enabled headsets, and wearable cameras), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, another sensor may be a motion detector, another sensor may be a global positioning system (GPS) receiver, and yet another sensor may be a digital image capture device (e.g., a camera) capable of capturing and transmitting one or more still digital images or a stream of digital images (e.g., digital video).

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a client of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The EPC program 107 may be a program capable of grouping sets of heterogeneous IoT devices to form logically singular edged devices, identifying an IoT device of a grouped set as a primary device of the grouped set, deploying a pre-trained tiny machine learning (ML) model on primary devices of grouped sets, identifying surrounding groups of IoT devices requiring immediate action in response to a detection event of a grouped set of IoT devices, activating transmission of data from selected grouped sets across a network to a cloud resource, and restricting transmission of data from non-selected grouped sets across a network to a cloud resource. In at least one embodiment, EPC program 107 may require a user to opt-in to system usage upon opening or installation of EPC program 107. Notwithstanding depiction in computer 101, EPC program 107 may be stored in and/or executed by, individually or in any combination, end user device 103, remote server 104, public cloud 105, and private cloud 106 so that functionality may be separated among the devices. The edge device data transmission method is explained in further detail below with respect to FIG. 2.

Figure 2:
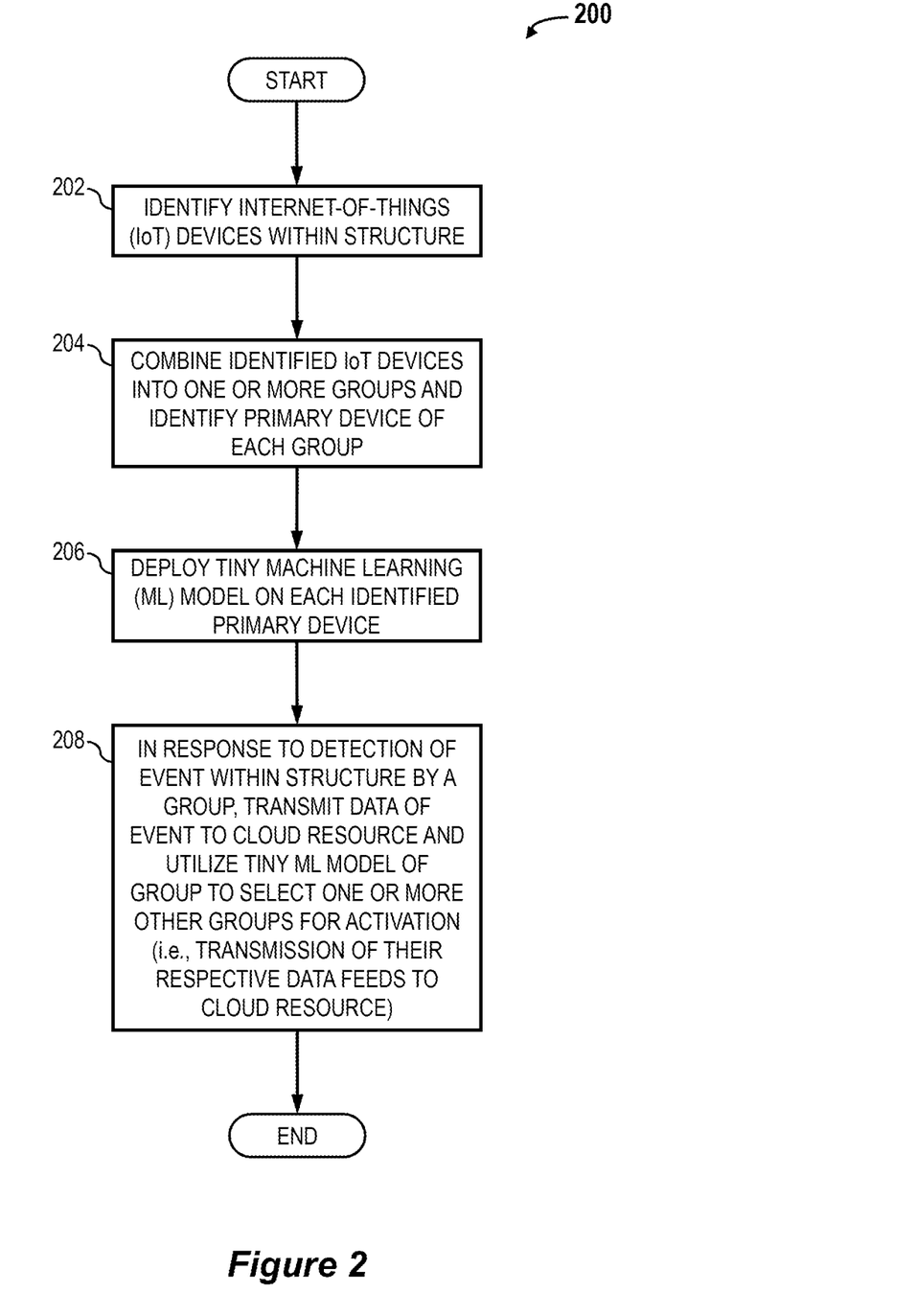
FIG. 2 illustrates an operational flowchart for uploading data from one or more edge devices via an edge device data transmission process according to at least one embodiment.

Referring now to FIG. 2, an operational flowchart for uploading data from one or more edge devices via an edge device data transmission process 200 is depicted according to at least one embodiment. At 202, EPC program 107 identifies IoT devices within a structure. As part of the identification, EPC program 107 may also identify a device type or capability (e.g., sensor/detection capability), an installation location within the structure, as well as technical specifications for each IoT device. According to at least one embodiment the identified IoT devices within the structure may include a heterogeneous set of IoT devices. For example, the structure (e.g., a building) may be equipped with one or more camera IoT devices, one or more smoke detector IoT devices, and one or more hazardous gas detector IoT devices.

Next, at 204, EPC program 107 combines the identified IoT devices into one or more groups and identifies a primary device within each group. According to at least one embodiment, identified IoT devices may be grouped based on a proximity of their respective installation locations within the structure. Further, each group may include identified IoT devices of varying types/capabilities, and each group may represent a singular edged device. Moreover, IoT devices of a group may have IoT connectivity and may communicate with each other via a wireless connectivity protocol such as low power Bluetooth or Z-wave or 6LowPan, etc. According to at least one embodiment, EPC program 107 may identify a primary device of a group based on a contextual analysis of technical specifications for IoT devices of the group. For example, the contextual analysis performed by EPC program 107 may include comparison, between IoT devices of a group, of computing speed, memory storage capacity, on-board microcontroller processing power, and ping duration. An IoT device of the group with a highest computing speed, highest memory storage capacity, highest on-board microcontroller processing power, and shortest ping duration, or any combination thereof, may be identified as the primary device of the group. In the event a selected primary device can no longer serve as the primary device of the group, EPC program 107 may identify an IoT device of the group having a next highest computing speed, highest memory storage capacity, highest on-board microcontroller processing power, and shortest ping duration, or any combination thereof, as the primary device of the group. According to at least one embodiment, each identified primary device of a group may be assigned a respective universally unique identifier (UUID), which may represent all devices of the group, and therefore may also represent the edged device represented by the group. Further, each identified primary device of a group may be responsible for communicating with other identified primary devices of other groups (i.e., communicating with other edged devices). Also, at 204, EPC program 107 may represent the IoT devices within the structure using a two-dimensional M×N matrix where each matrix element represents a group of IoT devices (i.e., each matrix element represents an edged device). Elements of the M×N matrix may include respective UUIDs of the groups of IoT devices. In other embodiments, the matrix may be three-dimensional in order to represent spatial relationships between groups of IoT devices within a multi-level structure.

At 206, EPC program 107 deploys a respective pre-trained tiny machine learning (ML) model on each identified primary device of each group. Tiny ML models are utilized as they may execute efficiently on low/limited processing power of IoT devices of the respective groupings. A deployed tiny ML model may be pre-trained with supervised or semi-supervised learning and may be capable of performing low-latency operations. For example, a deployed tiny ML model of an edged device (i.e., an IoT device grouping) may take as input a detection status of the edged device (i.e., a detection status from one or more IoT devices of the group representing the edged device) and output one or more actions (e.g., activation, deactivation) to be taken with one or more other groupings (i.e., one or more other edged devices). Additionally, a deployed tiny ML model of an edged device may be capable of identifying one or more other edged devices, based on a threshold proximity of the edged device, and activating them (i.e., activating operation of one or more IoT devices within other groupings which represent other edged devices and permitting transmission of their collected data to a cloud resource). Identification of one or more other edged devices may also be based on a context (e.g., a type) of an event detected by the edged device and a layout of a structure. For example, movement detected by a camera IoT device of the edged device may result in EPC program 107, via the tiny ML model of the edged device, identifying, based on a proximity or structure layout, one or more other edged devices having respective camera IoT devices, and activating the respective camera IoT devices of the one or more other edged devices.

Next, at 208, in response to detection of an event within the structure by a group (i.e., an edged device) of the one or more groups (i.e., the one or more edged devices) created at 204, EPC program 107 transmits data of the event, collected by the edged device, to a cloud resource and utilizes the tiny ML model of the edged device to identify and select one or more other edged devices for activation and transmission of their respective data feeds to the cloud resource. The selected one or more other edged devices may be selected based on a threshold proximity to the edged device and/or selected based on a context of the event detected by the edged device. Further, non-selected edged devices may not be activated and transmission of their respective data feeds to the cloud resource may be restricted by EPC program 107. For example, EPC program 107 may broadcast a streaming request to the selected one or more other edged devices, and broadcast a no-streaming request to non-selected edged devices. As a result of activating only the selected edged devices, network bandwidth consumption may not create any bottlenecks and instead may be utilized in an optimum way.

As an illustrative example of the above-described functionality of embodiments of the present invention, consider a scenario in which a premises is equipped with a surveillance system including multiple IoT devices of varying sensor capabilities such as close-circuit television (CCTV) devices, smoke detectors, and hazardous gas detectors. Heterogeneous groups of IoT devices may be formed where CCTV edge devices, which have relatively higher processing power and memory than other IoT devices of their respective groups, are identified as the primary device within their respective groups. The other IoT devices within the groups may be connected to their respective primary device via low power Bluetooth connectivity. Respective instances of a tiny ML model may be deployed on each of the identified primary devices. The tiny ML model may take the set of IoT devices which are installed within the premise and represent them using an M×N matrix, where each matrix element represents a single group of IoT devices such as a CCTV device, a smoke detector, and a hazardous gas detector, and where each group of IoT devices represents a respective edged device. In an event where a smoke detector of a group detects smoke in a part of the building and triggers a fire alarm, the premise may need to be evacuated. Evacuation of the premise may create a lot of movement within the premise which, in turn, may cause multiple CCTV devices to activate (i.e., capture video and transmit to a cloud service) and may potentially create a network bottleneck. However, with embodiments of the proposed invention in place, the tiny ML model of the group may identify the surrounding set of edged devices which need the immediate attention. The matrix element number which represents the group containing the smoke detector may be identified, further a submatrix around the matrix element number may also be identified by the primary device of the group. The submatrix represents the set of edged devices (i.e., other groups) surrounding the group containing the smoke detector and requiring immediate action. Identification information of the submatrix may be broadcasted across the network causing the groups of IoT devices (i.e., edged devices) which are present in the submatrix to be instantly activated, while groups of IoT devices which are not present in the submatrix are not activated. Accordingly, data transmission to the cloud resource from the groups of IoT devices which are not present in the submatrix may be restricted. Since only a subset of groups of IoT devices have been activated, network bandwidth utilization will not create any bottleneck and instead will be used in an optimum way. Furthermore, the groups of IoT devices within the submatrix do not need to wait for a detection event and instead begin to transmit information to the cloud service without delay.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
identifying one or more Internet-of-Things (IoT) devices within a structure;
combining the identified one or more IoT devices into one or more groups based on a proximity of their respective installation locations within the structure;
identifying a respective primary device within each group of the one or more groups;
deploying a tiny machine learning (ML) model on each identified respective primary device;
in response to detection of an event within the structure by a group of the one or more groups, utilizing the tiny ML model of a primary device of the group to select one or more other groups for activation, wherein selection of the one or more other groups is based, in part, on a type of the event, and wherein a selected other group detects events of the type;
transmitting, to a cloud resource, data of the event collected by the group;
broadcasting a streaming request to the selected one or more other groups to transmit, to the cloud resource, data of the event collected by the selected one or more other groups; and
broadcasting a no-streaming request to unselected groups of the one or more groups to restrict data transmission from the unselected groups.

2. The method of claim 1, wherein identifying the one or more IoT devices within the structure further comprises identifying a device type or capability, an installation location within the structure, and technical specifications for each IoT device of the one or more IoT devices.

3. The method of claim 1, wherein identifying a respective primary device for each group of the one or more groups further comprises:
comparing respective computing speeds, memory storage capacities, on-board microcontroller processing power, and ping durations of each IoT device of a group; and
identifying, as primary device for the group, an IoT device of the group having a highest computing speed, a highest memory storage capacity, a highest on-board microcontroller processing power, and a shortest ping duration, or any combination thereof.

4. The method of claim 1, wherein activation of the one or more other groups further comprises:
activating operation of IoT devices of the one or more other groups; and
permitting transmission of data from the one or more other groups to a cloud resource.

5. The method of claim 1, wherein selection of the one or more other groups for activation is further based on a location proximity to the group.

6. The method of claim 1, wherein the one or more IoT devices within the structure comprises a heterogeneous set of IoT devices.

7. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
identifying one or more Internet-of-Things (IoT) devices within a structure;
combining the identified one or more IoT devices into one or more groups based on a proximity of their respective installation locations within the structure;
identifying a respective primary device within each group of the one or more groups;
deploying a tiny machine learning (ML) model on each identified respective primary device;
in response to detection of an event within the structure by a group of the one or more groups, utilizing the tiny ML model of a primary device of the group to select one or more other groups for activation, wherein selection of the one or more other groups is based, in part, on a type of the event, and wherein a selected other group detects events of the type;
transmitting, to a cloud resource, data of the event collected by the group;
broadcasting a streaming request to the selected one or more other groups to transmit, to the cloud resource, data of the event collected by the selected one or more other groups; and
broadcasting a no-streaming request to unselected groups of the one or more groups to restrict data transmission from the unselected groups.

8. The computer system of claim 7, wherein identifying the one or more IoT devices within the structure further comprises identifying a device type or capability, an installation location within the structure, and technical specifications for each IoT device of the one or more IoT devices.

9. The computer system of claim 7, wherein identifying a respective primary device for each group of the one or more groups further comprises:
comparing respective computing speeds, memory storage capacities, on-board microcontroller processing power, and ping durations of each IoT device of a group; and
identifying, as primary device for the group, an IoT device of the group having a highest computing speed, a highest memory storage capacity, a highest on-board microcontroller processing power, and a shortest ping duration, or any combination thereof.

10. The computer system of claim 7, wherein activation of the one or more other groups further comprises:
activating operation of IT devices of the one or more other groups; and
permitting transmission of data from the one or more other groups to a cloud resource.

11. The computer system of claim 7, wherein selection of the one or more other groups for activation is further based on a location proximity to the group.

12. The computer system of claim 7, wherein the one or more IoT devices within the structure comprises a heterogeneous set of IoT devices.

13. A computer program product, the computer program product comprising:

one or more computer-readable tangible storage medium and program instructions stored on at least one of the one or more tangible storage medium, the program instructions executable by a processor capable of performing a method, the method comprising:

identifying one or more Internet-of-Things (IoT) devices within a structure;

combining the identified one or more IoT devices into one or more groups based on a proximity of their respective installation locations within the structure;

identifying a respective primary device within each group of the one or more groups;

deploying a tiny machine learning (ML) model on each identified respective primary device;

in response to detection of an event within the structure by a group of the one or more groups, utilizing the tiny ML model of a primary device of the group to select one or more other groups for activation, wherein selection of the one or more other groups is based, in part, on a type of the event, and wherein a selected other group detects events of the type;

transmitting, to a cloud resource, data of the event collected by the group;

broadcasting a streaming request to the selected one or more other groups to transmit, to the cloud resource, data of the event collected by the selected one or more other groups; and broadcasting a no-streaming request to unselected groups of the one or more groups to restrict data transmission from the unselected groups.

14. The computer program product of claim 13, wherein identifying the one or more IoT devices within the structure further comprises identifying a device type or capability, an installation location within the structure, and technical specifications for each IoT device of the one or more IoT devices.

15. The computer program product of claim 13, wherein identifying a respective primary device for each group of the one or more groups further comprises:

comparing respective computing speeds, memory storage capacities, on-board microcontroller processing power, and ping durations of each IoT device of a group; and identifying, as primary device for the group, an IoT device of the group having a highest computing speed, a highest memory storage capacity, a highest on-board microcontroller processing power, and a shortest ping duration, or any combination thereof.

16. The computer program product of claim 13, wherein activation of the one or more other groups further comprises:

activating operation of IoT devices of the one or more other groups; and permitting transmission of data from the one or more other groups to a cloud resource.

17. The computer program product of claim 13, wherein selection of the one or more other groups for activation is further based on a location proximity to the group.

\* \* \* \* \*